United States Patent
Fujii et al.

(10) Patent No.: US 12,498,269 B2
(45) Date of Patent: Dec. 16, 2025

(54) PHASE ANALYZER, SAMPLE ANALYZER, AND ANALYSIS METHOD

(71) Applicant: JEOL Ltd., Tokyo (JP)

(72) Inventors: Atsuhiro Fujii, Tokyo (JP); Kouta Itoh, Tokyo (JP); Yuka Otake, Tokyo (JP)

(73) Assignee: JEOL Ltd., Tokyo (JP)

( * ) Notice: Subject to any disclaimer, the term of this patent is extended or adjusted under 35 U.S.C. 154(b) by 442 days.

(21) Appl. No.: 18/108,209

(22) Filed: Feb. 10, 2023

(65) Prior Publication Data

US 2023/0258499 A1  Aug. 17, 2023

(30) Foreign Application Priority Data

Feb. 16, 2022  (JP) .................. 2022-022238

(51) Int. Cl.
*G01J 3/28* (2006.01)
*G01J 3/02* (2006.01)

(52) U.S. Cl.
CPC ............ *G01J 3/2823* (2013.01); *G01J 3/027* (2013.01)

(58) Field of Classification Search
CPC ............................... G01J 3/2823; G01J 3/027
See application file for complete search history.

(56) References Cited

U.S. PATENT DOCUMENTS

| 6,675,106 B1 * | 1/2004 | Keenan .............. G01J 3/28 702/194 |
| 2010/0032571 A1 * | 2/2010 | Shelley ........... G01N 21/3563 250/341.8 |
| 2013/0266959 A1 * | 10/2013 | Kaiser .............. G01N 15/147 435/7.1 |
| 2015/0362446 A1 | 12/2015 | Kato et al. |

FOREIGN PATENT DOCUMENTS

| JP | 201020997 A | 2/2010 |
| JP | 2015219217 A | 12/2015 |

OTHER PUBLICATIONS

Office Action issued in JP2022022238 on Feb. 13, 2024.

* cited by examiner

*Primary Examiner* — Nicole M Ippolito
(74) *Attorney, Agent, or Firm* — The Webb Law Firm

(57) ABSTRACT

A phase analyzer includes a data acquisition unit that acquires a plurality of pieces of spectrum imaging data in which positions on a sample are associated with spectra which are based on signals from the sample; a first acquisition unit that acquires a first representative spectrum group for each piece of spectrum imaging data by performing multivariate analysis on each of the plurality of pieces of spectrum imaging data; a second acquisition unit that acquires a second representative spectrum group by performing multivariate analysis on the plurality of first representative spectrum groups acquired by the first acquisition unit; and a phase analysis unit that performs phase analysis on each of the plurality of pieces of spectrum imaging data by using the second representative spectrum group.

6 Claims, 9 Drawing Sheets

PHASE ANALYZER, SAMPLE ANALYZER, AND ANALYSIS METHOD

CROSS-REFERENCE TO RELATED APPLICATION

This application claims priority to Japanese Patent Application No. 2022-022238, filed Feb. 16, 2022, the disclosure of which is hereby incorporated by reference in its entirety.

BACKGROUND OF THE INVENTION

Field of the Invention

The invention relates to a phase analyzer, a sample analyzer, and an analysis method.

In a scanning electron microscope equipped with an X-ray detector such as an energy-dispersive X-ray spectrometer (EDS) or a wavelength-dispersive X-ray spectrometer (WDS), spectrum imaging data in which positions on a sample are associated with X-ray spectra can be acquired. Phase analysis is known as a method for determining the distribution of a compound using spectrum imaging data.

Description of Related Art

Phase analysis is a method for extracting phases of a compound from correlative relationships between a plurality of elements and examining the distribution of each phase. JP-A-2015-219217, for example, discloses a method for creating a phase map showing distributions of the phases of a compound from element map data. In the method disclosed in JP-A-2015-219217, the phases of the compound are extracted on the basis of correlative relationships between a plurality of elements using principal component analysis, and therefore the user can easily create the phase map without the need to select an appropriate combination of elements from among a large number of elements and determine the correlative relationships therebetween.

With an electron microscope, observation can be performed at a high magnification, but the field of view acquired with an electron microscope is narrow. Accordingly, JP-A-2010-20997 discloses a method employed in an electron microscope, in which a plurality of observation images are acquired by repeatedly performing photography while moving the field of view, and a single, large image (a montage image) is created by connecting the plurality of acquired observation images. On the montage image, a wide area of the sample can be observed at one time.

By employing a similar method to the method described in JP-A-2010-20997 in relation to a phase map, it is possible to acquire a montage image on which the compound distribution can be observed over a large area of the sample. For example, by creating a phase map for each piece of spectrum imaging data and then creating a combined phase map by combining the plurality of phase maps, a montage image on which the compound distribution can be observed is acquired. In this case, however, a phase map is created for each piece of spectrum imaging data, and therefore, if the individual phase maps are inconsistent, identical phases (compounds) existing on a plurality of phase maps may be classified as separate phases.

SUMMARY OF THE INVENTION

According to a first aspect of the present disclosure, there is provided a phase analyzer including:

a data acquisition unit that acquires a plurality of pieces of spectrum imaging data in which positions on a sample are associated with spectra which are based on signals from the sample;

a first acquisition unit that acquires a first representative spectrum group for each piece of spectrum imaging data by performing multivariate analysis on each of the plurality of pieces of spectrum imaging data;

a second acquisition unit that acquires a second representative spectrum group by performing multivariate analysis on the plurality of first representative spectrum groups acquired by the first acquisition unit; and a phase analysis unit that performs phase analysis on each of the plurality of pieces of spectrum imaging data by using the second representative spectrum group.

According to a second aspect of the present disclosure, there is provided a sample analyzer including the above phase analyzer.

According to a third aspect of the present disclosure, there is provided an analysis method including:

acquiring a plurality of pieces of spectrum imaging data in which positions on a sample are associated with spectra which are based on signals from the sample;

acquiring a first representative spectrum group for each piece of spectrum imaging data by performing multivariate analysis on each of the plurality of pieces of spectrum imaging data;

acquiring a second representative spectrum group by performing multivariate analysis on the acquired plurality of first representative spectrum groups; and performing phase analysis on each of the plurality of pieces of spectrum imaging data by using the second representative spectrum group.

DESCRIPTION OF THE INVENTION

Figure 1:
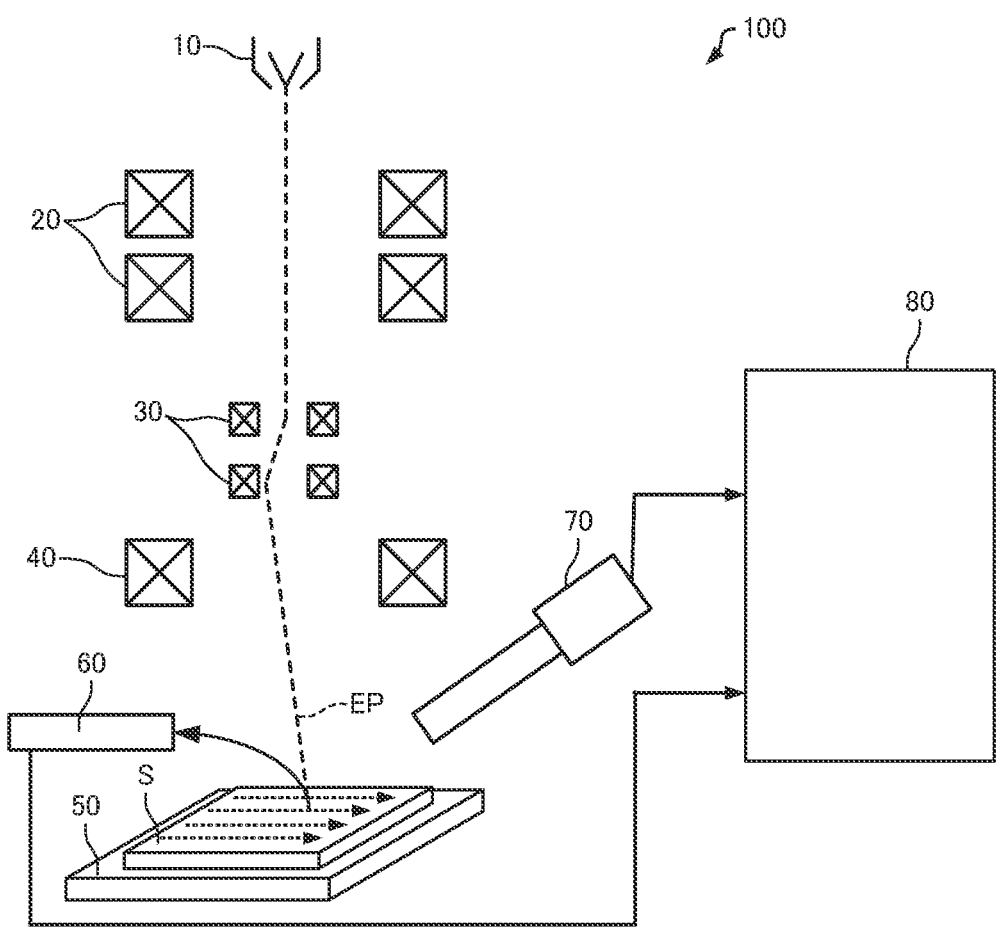
FIG. 1 is a diagram illustrating a configuration of a sample analyzer including a phase analyzer according to an embodiment of the invention.

According to an embodiment of the present disclosure, there is provided a phase analyzer including:
- a data acquisition unit that acquires a plurality of pieces of spectrum imaging data in which positions on a sample are associated with spectra which are based on signals from the sample;
- a first acquisition unit that acquires a first representative spectrum group for each piece of spectrum imaging data by performing multivariate analysis on each of the plurality of pieces of spectrum imaging data;
- a second acquisition unit that acquires a second representative spectrum group by performing multivariate analysis on the plurality of first representative spectrum groups acquired by the first acquisition unit; and
- a phase analysis unit that performs phase analysis on each of the plurality of pieces of spectrum imaging data by using the second representative spectrum group.

In this phase analyzer, the second representative spectrum group is acquired by performing multivariate analysis on the plurality of first representative spectrum groups, whereupon the second representative spectrum group is used to perform phase analysis on each of the plurality of pieces of spectrum imaging data, and as a result, consistent phase analysis results can be acquired from the plurality of pieces of spectrum imaging data.

According to an embodiment of the present disclosure, there is provided a sample analyzer including the above phase analyzer.

According to an embodiment of the present disclosure, there is provided an analysis method including:
- acquiring a plurality of pieces of spectrum imaging data in which positions on a sample are associated with spectra which are based on signals from the sample;
- acquiring a first representative spectrum group for each piece of spectrum imaging data by performing multivariate analysis on each of the plurality of pieces of spectrum imaging data;
- acquiring a second representative spectrum group by performing multivariate analysis on the acquired plurality of first representative spectrum groups; and
- performing phase analysis on each of the plurality of pieces of spectrum imaging data by using the second representative spectrum group.

In this phase analysis method, the second representative spectrum group is acquired by performing multivariate analysis on the plurality of first representative spectrum groups, whereupon the second representative spectrum group is used to perform phase analysis on each of the plurality of pieces of spectrum imaging data, and as a result, consistent phase analysis results can be acquired from the plurality of pieces of spectrum imaging data.

Preferred embodiments of the invention will be described in detail below with reference to the figures. It is noted that the embodiments described below do not unduly limit the scope of the invention described in the claims. In addition, all of the components described below are not necessarily essential requirements of the invention.

1. PHASE ANALYZER

First, a phase analyzer according to an embodiment of the invention will be described with reference to the figures. FIG. 1 is a diagram illustrating a configuration of a sample analyzer 100 including a phase analyzer 80 according to this embodiment of the invention.

The sample analyzer 100 is a scanning electron microscope equipped with an X-ray detector 70. In the sample analyzer 100, a sample S is scanned by an electron probe EP, whereby spectrum imaging data in which positions on the sample S are associated with X-ray spectra can be acquired.

As illustrated in FIG. 1, the sample analyzer 100 includes an electron gun 10, a condenser lens 20, a scanning coil 30, an objective lens 40, a sample stage 50, a secondary electron detector 60, the X-ray detector 70, and the phase analyzer 80.

The electron gun 10 emits an electron beam. For example, the electron gun 10 accelerates electrons emitted from a cathode using an anode, and emits an electron beam.

The condenser lens 20 and the objective lens 40 form the electron probe EP by focusing the electron beam emitted from the electron gun 10. A probe diameter and a probe current can be controlled by the condenser lens 20.

The scanning coil 30 deflects the electron beam two-dimensionally. By two-dimensionally deflecting the electron beam using the scanning coil 30, the sample S can be scanned by the electron probe EP.

The sample stage 50 is capable of holding the sample S. The sample stage 50 includes a moving mechanism for moving the sample S.

The secondary electron detector 60 detects secondary electrons that are emitted from the sample S when the sample S is irradiated with the electron beam. By scanning the sample S with the electron beam EP and detecting the secondary electrons emitted from the sample S using the secondary electron detector 60, a secondary electron image can be acquired. Note that the sample analyzer 100 may also include a reflected electron detector for detecting reflected electrons that are emitted from the sample S when the sample S is irradiated with the electron beam.

The X-ray detector 70 detects characteristic X-rays that are emitted from the sample S when the sample S is irradiated with the electron beam. The X-ray detector 70 is an energy-dispersive X-ray spectrometer (EDS), for example. Note that the X-ray detector 70 may also be a wavelength-dispersive X-ray spectrometer (WDS). By scanning the sample S with the electron beam EP and detecting the characteristic X-rays emitted from the sample S using the X-ray detector 70, spectrum imaging data can be acquired.

The spectrum imaging data are data in which positions (coordinates) on the sample are associated with spectra which are based on signals from the sample. In other words, the spectrum imaging data are a collection of spectra. In the sample analyzer 100, data in which positions on the sample S are associated with X-ray spectra (EDS spectra) can be acquired as the spectrum imaging data. In the sample analyzer 100, an X-ray spectrum is collected for each pixel while scanning the sample S with the electron probe EP, whereupon the position (the coordinates of the pixel) on the sample S and the X-ray spectrum are stored in association with each other. Thus, the spectrum imaging data can be acquired.

The phase analyzer (information processing device) 80 performs phase analysis using the spectrum imaging data, and displays the result of the phase analysis.

Figure 2:
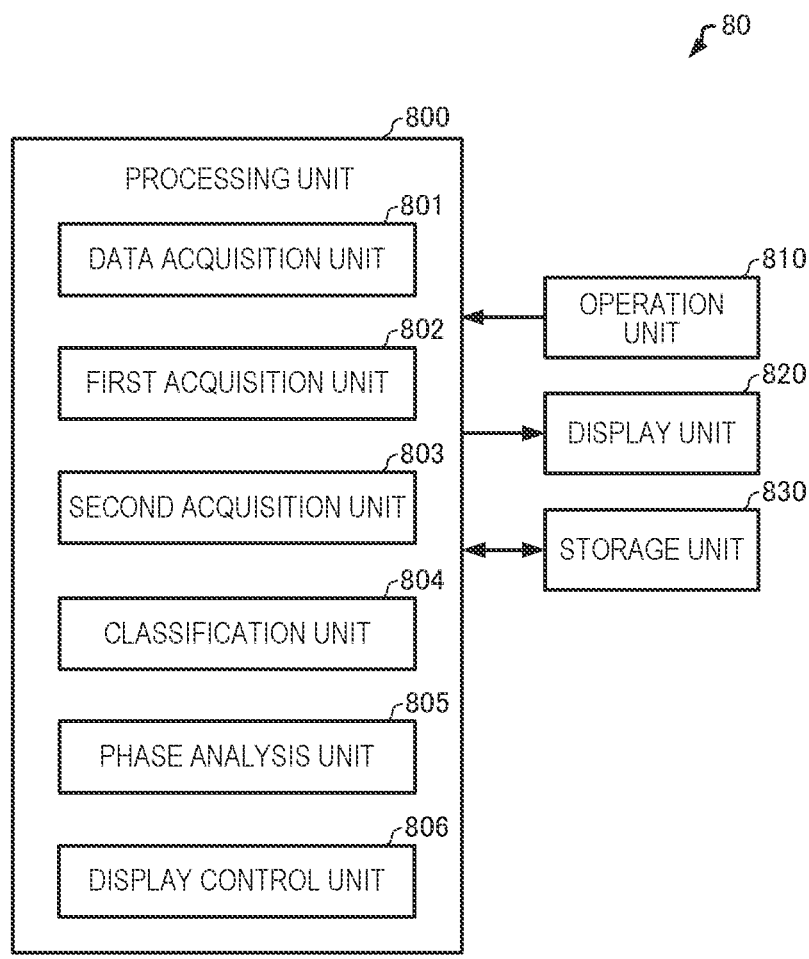
FIG. 2 is a diagram illustrating a configuration of a phase analyzer according to an embodiment of the invention.

FIG. 2 is a diagram illustrating a configuration of the phase analyzer 80.

As illustrated in FIG. 2, the phase analyzer 80 includes a processing unit 800, an operation unit 810, a display unit 820, and a storage unit 830.

The operation unit 810 is used by a user to input operation information, and outputs the input operation information to the processing unit 800. The functions of the operation unit 810 can be realized by an input device such as a keyboard, a mouse, a button, a touch panel, or a touch pad.

The display unit 820 displays images generated by the processing unit 800, and the functions thereof can be realized by a display such as an LCD (Liquid Crystal Display) or a CRT (Cathode Ray Tube).

The storage unit 830 stores a program for causing a computer to function as respective units of the processing unit 800, as well as various data. The storage unit 830 also functions as a working area of the processing unit 800. The functions of the storage unit 830 can be realized by a hard disk, a RAM (Random Access Memory), or the like.

The processing unit 800 functions as a data acquisition unit 801, a first acquisition unit 802, a second acquisition unit 803, a classification unit 804, a phase analysis unit 805, and a display control unit 806, to be described below, by executing the program stored in the storage unit 830. The functions of the processing unit 800 can be realized by executing the program using hardware such as various types of processors (a CPU (Central Processing Unit), a DSP (Digital Signal Processor), or the like) or an ASIC (Application Specific Integrated Circuit). The processing unit 800 includes the data acquisition unit 801, the first acquisition unit 802, the second acquisition unit 803, the classification unit 804, the phase analysis unit 805, and the display control unit 806.

The data acquisition unit 801 acquires a plurality of pieces of spectrum imaging data, which are acquired by analyzing the sample S using the sample analyzer 100. The plurality of pieces of imaging data are related data. For example, the plurality of pieces of imaging data are a plurality of pieces of data acquired by analyzing the same sample.

The first acquisition unit 802 acquires a representative spectrum group (partial representative spectrums) for each of the plurality of pieces of spectrum imaging data acquired by the data acquisition unit 801 by performing multivariate analysis on each piece of spectrum imaging data. Methods such as a self-organizing map, a hierarchical clustering method, a K-means method, principal component analysis, singular value decomposition, non-negative matrix decomposition, and vertex component analysis may be cited as the multivariate analysis. Furthermore, these methods may be combined.

The first acquisition unit 802 extracts a plurality of representative spectra (representative spectra) from the plurality of X-ray spectra included in each of the plurality of pieces of spectrum imaging data by performing multivariate analysis on each piece of spectrum imaging data. In other words, the first acquisition unit 802 performs multivariate analysis using the plurality of X-ray spectra included in the spectrum imaging data as a subject in order to analyze the pattern formed by the X-ray spectra.

The plurality of representative spectra extracted from each piece of spectrum imaging data in this manner are referred to as a partial representative spectrum group. In other words, the first acquisition unit 802 acquires partial representative spectrum groups in a number corresponding to the number of pieces of spectrum imaging data.

The second acquisition unit 803 acquires a representative spectrum group (an overall representative spectrum group) representing all of the plurality of pieces of spectrum imaging data by performing multivariate analysis on the plurality of partial representative spectrum groups acquired by the first acquisition unit 802.

The second acquisition unit 803 extracts a plurality of representative spectra from all of the representative spectra included in the plurality of partial representative spectrum groups acquired by the first acquisition unit 802 by performing multivariate analysis on the plurality of partial representative spectrum groups. In other words, the second acquisition unit 803 performs multivariate analysis using all of the representative spectra included in the plurality of partial representative spectrum groups as a subject in order to analyze the representative spectrum pattern formed by the plurality of partial representative spectrum groups.

In so doing, the second acquisition unit 803 acquires an overall representative spectrum group constituted by a plurality of representative spectra representing all of the plurality of pieces of spectrum imaging data.

Methods such as a self-organizing map, a hierarchical clustering method, a K-means method, principal component analysis, singular value decomposition, non-negative matrix decomposition, and vertex component analysis may be cited as the multivariate analysis performed by the second acquisition unit 803. The multivariate analysis method implemented by the second acquisition unit 803 may be identical to or different from the multivariate analysis method implemented by the first acquisition unit 802.

The classification unit 804 classifies the plurality of representative spectra included in the overall representative spectrum group acquired by the second acquisition unit 803. For example, the classification unit 804 classifies the plurality of representative spectra included in the overall representative spectrum group by performing cluster analysis on the overall representative spectrum group, and in so doing creates clusters. Cluster analysis is a type of multivariate analysis, and serves as unsupervised learning for collecting and grouping similar data from data groups. A hierarchical clustering method, a K-means method, and so on may be cited as the cluster analysis.

The phase analysis unit 805 determines similarities between the X-ray spectra of the pixels and the plurality of representative spectra included in the overall representative spectrum group for each of the plurality of pieces of spectrum imaging data, and determines the cluster (phase) to which the spectrum of each pixel belongs. In other words, the phase analysis unit 805 identifies the phase (compound) of each pixel by classifying the X-ray spectrum of each pixel according to the cluster (pattern), classified by the classification unit 804, to which the X-ray spectrum belongs. For example, the phase analysis unit 805 creates a phase map by color-coding the identified phase of each pixel.

The phase analysis unit 805 creates a combined phase map by combining the phase maps created for the respective pieces of spectrum imaging data.

The display control unit 806 displays the combined phase map on the display unit 820.

2. ANALYSIS METHOD

Figure 3:
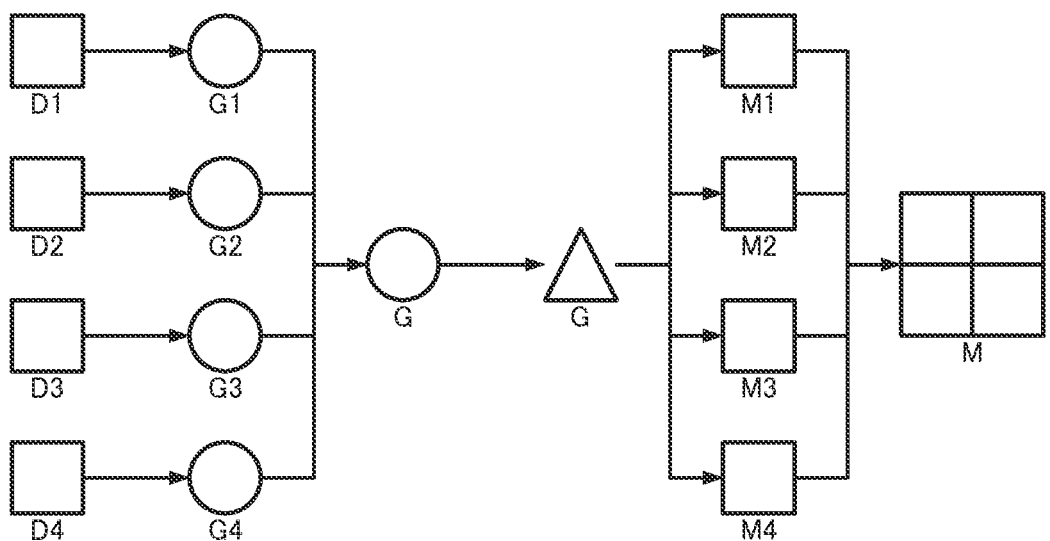
FIG. 3 is a diagram for describing an analysis method employed in a phase analyzer according to an embodiment of the invention.
Figure 4:
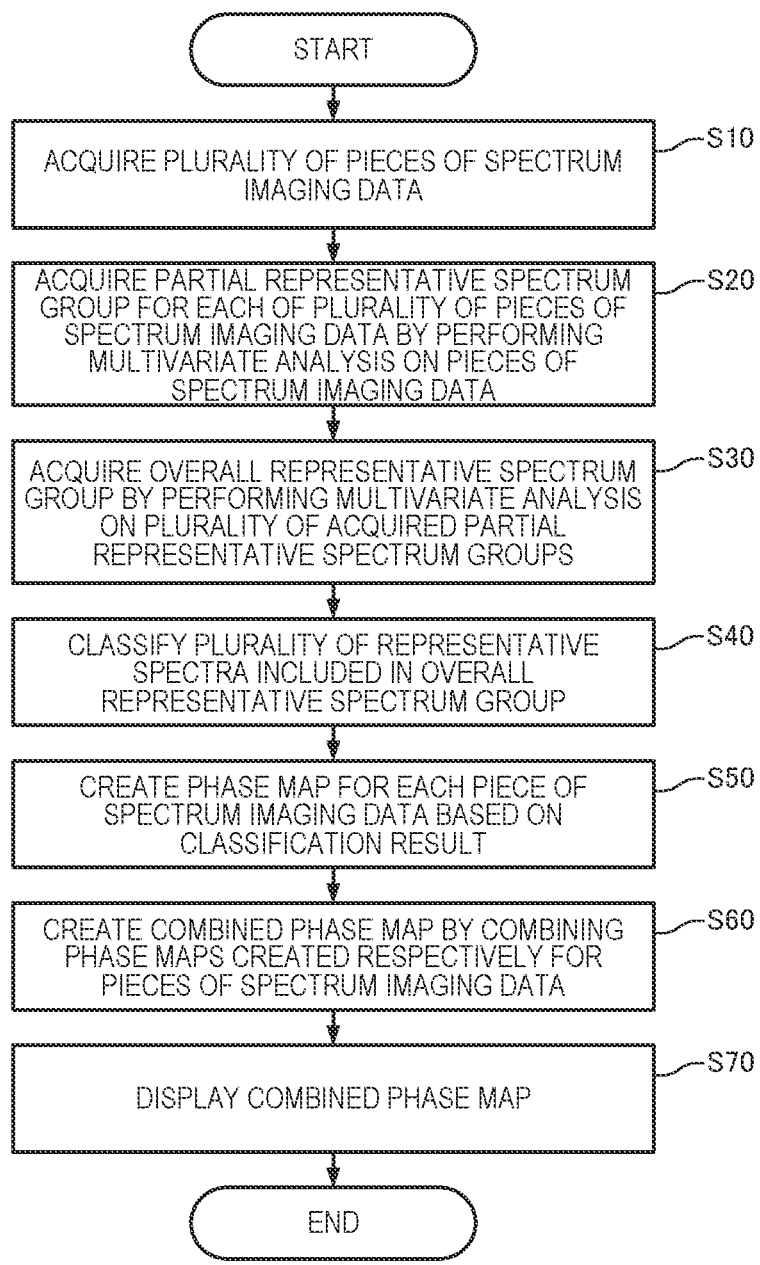
FIG. 4 is a flowchart illustrating an example of a flow of processing executed by a phase analyzer according to an embodiment of the invention.

FIG. 3 is a diagram for describing the analysis method employed in the phase analyzer 80. FIG. 4 is a flowchart illustrating an example of a flow of the processing executed by the phase analyzer 80.

(1) Acquisition of Spectrum Imaging Data S10

The data acquisition unit 801 acquires a plurality of pieces of spectrum imaging data, which are acquired by analyzing the sample S using the sample analyzer 100. In the example in FIG. 3, the data acquisition unit 801 acquires four pieces of spectrum imaging data (a first spectrum imaging data piece D1, a second spectrum imaging data piece D2, a third spectrum imaging data piece D3, and a fourth spectrum imaging data piece D4).

Figure 5:
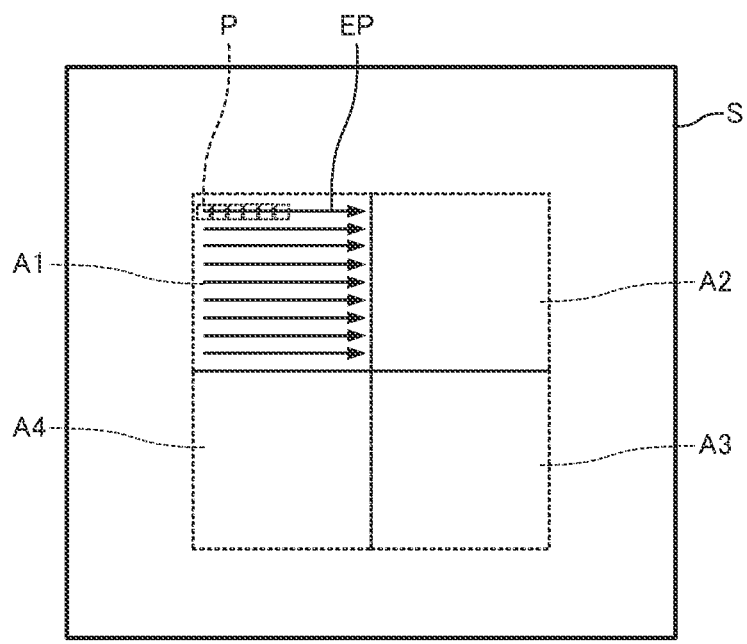
FIG. 5 is a diagram schematically illustrating a surface of a sample.

FIG. 5 is a diagram schematically illustrating the surface of the sample S.

As illustrated in FIG. 5, in the sample analyzer 100, by scanning a first area A1 of the sample S with the electron probe EP, detecting X-rays emitted from the sample S using the X-ray detector 70, and storing the detection positions (the coordinates on the sample S) and the X-ray spectrum data in association with each other, the first spectrum imaging data piece D1 of the first area A1 can be acquired. The data acquisition unit 801 acquires the first spectrum imaging data piece D1 acquired by analyzing the first area A1 using the sample analyzer 100. In the first spectrum imaging data piece D1, a position on the sample S corresponding to each pixel P and the X-ray spectrum acquired in that position on the sample S are stored in association with each other.

Likewise with regard to a second area A2 adjacent to the first area A1, analysis is performed by the sample analyzer 100 in a similar manner to the first area A1, whereby the data acquisition unit 801 acquires the second spectrum imaging data piece D2. When moving to the second area A2 after completing analysis of the first area A1, the sample S is moved by the sample stage 50. In so doing, a larger area than the scanning range of the electron probe EP can be measured.

Likewise with regard to a third area A3 adjacent to the second area A2 and a fourth area A4 adjacent to the third area A3, analysis is performed by the sample analyzer 100 in a similar manner to the first area A1, whereby the data acquisition unit 801 acquires the third spectrum imaging data piece D3 and the fourth spectrum imaging data piece D4.

The first spectrum imaging data piece D1, second spectrum imaging data piece D2, third spectrum imaging data piece D3, and fourth spectrum imaging data piece D4 acquired by the data acquisition unit 801 are stored in the storage unit 830.

(2) Acquisition of Partial Representative Spectrum Groups S20

The first acquisition unit 802 acquires a partial representative spectrum group for each of the four pieces of spectrum imaging data acquired by the data acquisition unit 801 by performing multivariate analysis on each piece of spectrum imaging data.

The first acquisition unit 802 extracts representative spectra by performing multivariate analysis on the first spectrum imaging data piece D1, and in so doing acquires a partial representative spectrum group G1. For example, the first acquisition unit 802 extracts the representative spectra using a self-organizing map.

Figure 6:
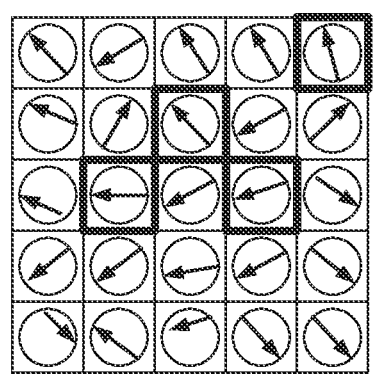
FIG. 6 is a diagram for describing a self-organizing map.

FIG. 6 is a diagram for describing the self-organizing map. In FIG. 6, circles represent nodes, arrows represent vectors, and nodes surrounded by thick frames represent winning nodes.

First, a vector is applied to all of the nodes on an output layer. Next, the node (the winning node) having the most similar vector on the output layer is searched for in relation to each piece of input data. Next, the amount of learning that each winning node applies to the peripheral nodes is determined. Next, all of the vectors on the output layer are updated to a weighted average of the input data. The processing for searching for the winning nodes, the processing for determining the learning amounts, and the processing for updating all of the vectors on the output layer are repeated a predetermined number of times. As a result, the vectors of the nodes on the output layer become representative vectors of the input data.

When learning an X-ray spectrum on which the horizontal axis is represented by the channel (the energy) and the vertical axis is represented by the X-ray intensity, each channel (energy) or ROI (region of interest) of the X-ray spectrum is set as a single dimension and handled as a vector having the X-ray intensity as a component. The ROI is a region having a predetermined energy width.

The first acquisition unit 802 extracts representative spectra from the first spectrum imaging data piece D1 using a self-organizing map, and in so doing acquires the partial representative spectrum group G1. The partial representative spectrum group G1 is a collection of spectra (representative spectra) representing the plurality of X-ray spectra included in the first spectrum imaging data piece D1.

The first acquisition unit 802 also extracts representative spectra from the second spectrum imaging data piece D2 using a self-organizing map in a similar manner to the first spectrum imaging data piece D1, and in so doing acquires the partial representative spectrum group G2.

The first acquisition unit 802 also extracts representative spectra from the third spectrum imaging data piece D3 using a self-organizing map in a similar manner to the first spectrum imaging data piece D1, and in so doing acquires the partial representative spectrum group G3.

The first acquisition unit 802 also extracts representative spectra from the fourth spectrum imaging data piece D4 using a self-organizing map in a similar manner to the first spectrum imaging data piece D1, and in so doing acquires the partial representative spectrum group G4.

Note that in the above description, the first acquisition unit 802 uses self-organizing maps to extract representative spectra from the spectrum imaging data, but the method for extracting representative spectra from the spectrum imaging data is not limited to a self-organizing map, and another type of multivariate analysis, such as a K-means method, may be used instead.

(3) Acquisition of Overall Representative Spectrum Group S30

The second acquisition unit 803 acquires an overall representative spectrum group G by performing multivariate analysis on the partial representative spectrum group G1, the partial representative spectrum group G2, the partial representative spectrum group G3, and the partial representative spectrum group G4. The second acquisition unit 803 performs the multivariate analysis using all of the representative spectra included in the partial representative spectrum group G1, the partial representative spectrum group G2, the partial representative spectrum group G3, and the partial representative spectrum group G4 as a subject.

Using the partial representative spectrum group G1, the partial representative spectrum group G2, the partial representative spectrum group G3, and the partial representative spectrum group G4 as input data, the second acquisition unit 803 extracts representative spectra from all of the representative spectra included in the partial representative spectrum group G1, the partial representative spectrum group G2, the partial representative spectrum group G3, and the partial representative spectrum group G4 by means of a self-organizing map, and in so doing acquires the overall representative spectrum group G.

Note that in the above description, the second acquisition unit 803 uses a self-organizing map to extract representative spectra from the partial representative spectrum groups, but the method for extracting representative spectra from the partial representative spectrum groups is not limited to a self-organizing map, and another type of multivariate analysis, such as a K-means method, may be used instead.

(4) Classification S40

The classification unit 804 classifies the plurality of representative spectra included in the overall representative spectrum group G. For example, the classification unit 804 classifies the plurality of representative spectra using a hierarchical clustering method, and in so doing creates clusters.

Figure 7:
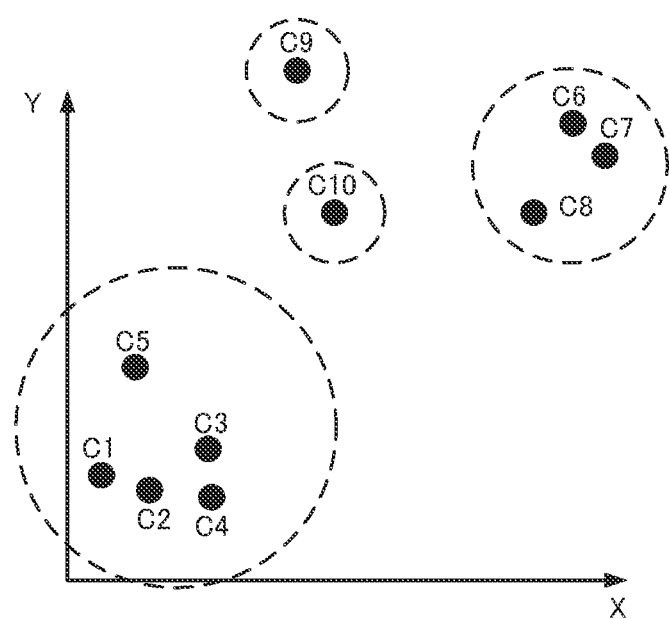
FIG. 7 is a diagram for describing a hierarchical clustering method.
Figure 8:
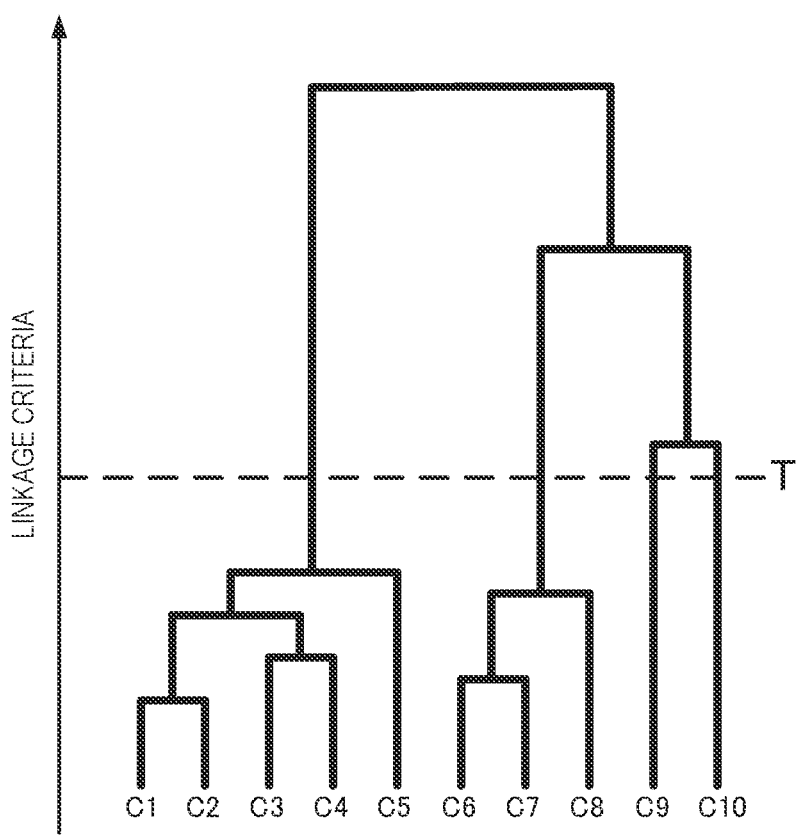
FIG. 8 is a diagram for describing a hierarchical clustering method.

FIGS. 7 and 8 are diagrams for describing a hierarchical clustering method.

As illustrated in FIGS. 7 and 8, the classification unit 804 creates clusters by merging the plurality of representative spectra (a representative spectrum C1, a representative spectrum C2, a representative spectrum C3, a representative spectrum C4, a representative spectrum C5, a representative spectrum C6, a representative spectrum C7, a representative spectrum C8, a representative spectrum C9, and a representative spectrum C10) included in the overall representative spectrum group G using a hierarchical clustering method.

More specifically, the classification unit 804 determines distances (degrees of dissimilarity) between the representative spectra C1, C2, C3, C4, C5, C6, C7, C8, C9, and C10 and distances (degrees of dissimilarity) between the clusters, and merges the representative spectra in order from the combination having the shortest distance. The merging process can be represented by a dendrogram. The distances required for merging are known as linkage criteria.

As illustrated in FIG. 8, by cutting a dendrogram along a threshold T, a new cluster can be created. In the hierarchical clustering method, a desired number of clusters can be created by adjusting the threshold T. In the example in the figure, four clusters are created by cutting the dendrogram along the threshold T.

(5) Phase Map Creation S50

The phase analysis unit 805 performs phase analysis on each of the plurality of pieces of spectrum imaging data D1, D2, D3, and D4 using the overall representative spectrum group G. More specifically, the phase analysis unit 805 creates phase maps by classifying the spectrum of each pixel in each piece of spectrum imaging data using the overall representative spectrum group G, and creates a combined phase map M by combining the phase maps created respectively for the pieces of spectrum imaging data.

First, the phase analysis unit 805 determines the similarity between the X-ray spectrum of each pixel of the first spectrum imaging data piece D1 and each representative spectrum included in the overall representative spectrum group G, and determines the cluster (the phase) to which the X-ray spectrum of each pixel belongs. As a result, the phase to which each pixel corresponds can be identified, and a phase map M1 can be created.

The phase analysis unit 805 creates a phase map M2 by performing similar processing to that of the first spectrum imaging data piece D1 likewise on the second spectrum imaging data piece D2. The phase analysis unit 805 creates a phase map M3 by performing similar processing to that of the first spectrum imaging data piece D1 likewise on the third spectrum imaging data piece D3. The phase analysis unit 805 creates a phase map M4 by performing similar processing to that of the first spectrum imaging data piece D1 likewise on the fourth spectrum imaging data piece D4.

(6) Phase Map Combining S60

The phase analysis unit 805 creates the combined phase map M by combining the phase map M1, the phase map M2, the phase map M3, and the phase map M4.

Figure 9:
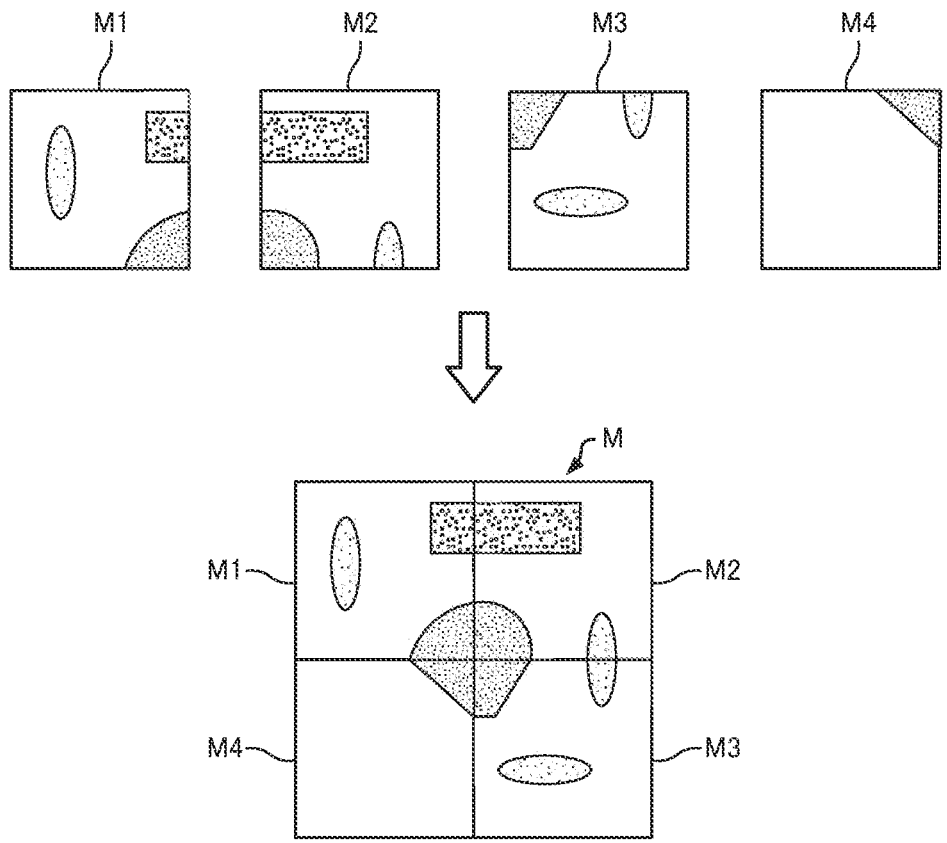
FIG. 9 is a diagram for describing processing for combining four phase maps.

FIG. 9 is a diagram for describing processing for combining the phase map M1, the phase map M2, the phase map M3, and the phase map M4.

As illustrated in FIG. 9, the phase map M1 is a map acquired by analyzing the first area A1, the phase map M2 is a map acquired by analyzing the second area A2, the phase map M3 is a map acquired by analyzing the third area A3, and the phase map M4 is a map acquired by analyzing the fourth area A4. Accordingly, the combined phase map M can be created by combining the phase map M1, the phase map M2, the phase map M3, and the phase map M4 on the basis of positional relationships between the respective areas illustrated in FIG. 9.

(7) Display S70

The display control unit 806 displays the combined phase map M on the display unit 820.

3. EFFECTS

The phase analyzer 80 includes the data acquisition unit 801 for acquiring a plurality of pieces of spectrum imaging data, the first acquisition unit 802 for acquiring a partial representative spectrum group (a first representative spectrum group) for each of the plurality of pieces of spectrum imaging data by performing multivariate analysis on each piece of spectrum imaging data, the second acquisition unit 803 for acquiring an overall representative spectrum group (a second representative spectrum group) by performing multivariate analysis on the plurality of partial representative spectrum groups acquired by the first acquisition unit 802, and the phase analysis unit 805 for performing phase analysis on each of the plurality of pieces of spectrum imaging data using the overall representative spectrum group.

Thus, in the phase analyzer 80, the overall representative spectrum group is acquired by performing multivariate analysis on the plurality of partial representative spectrum groups acquired by the first acquisition unit 802, whereupon phase analysis is performed on each of the plurality of pieces of spectrum imaging data using the overall representative spectrum group, and as a result, consistent phase analysis results (phase maps) can be acquired from the plurality of pieces of spectrum imaging data.

Figure 10:
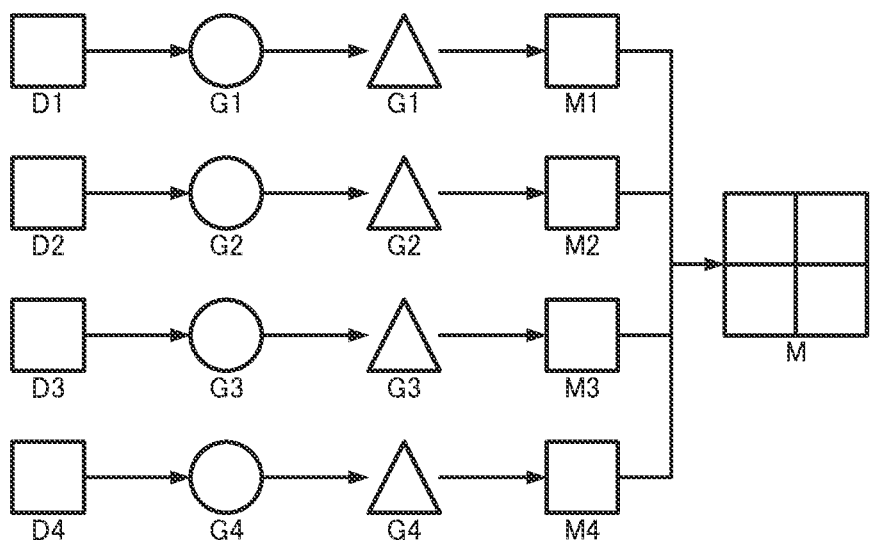
FIG. 10 is a diagram for describing an analysis method according to a reference example.
Figure 11:
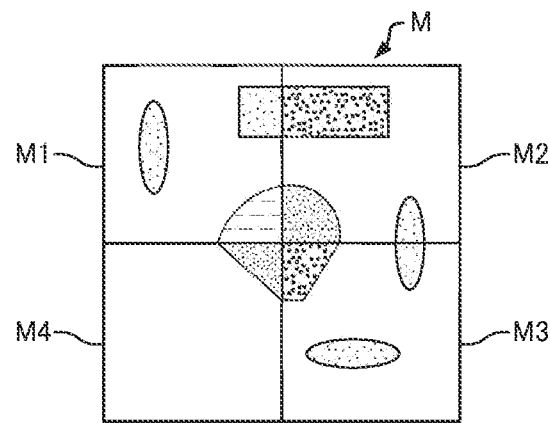
FIG. 11 is a diagram schematically illustrating a combined phase map acquired by the analysis method according to the reference example.

FIG. 10 is a diagram for describing an analysis method according to a reference example. FIG. 11 is a diagram schematically illustrating the combined phase map M acquired by the analysis method according to the reference example.

In the analysis method according to the reference example, as illustrated in FIG. 10, the partial representative spectrum group G1 is acquired from the first spectrum imaging data piece D1 using a self-organizing map, the plurality of representative spectra included in the acquired partial representative spectrum group G1 are classified using the hierarchical clustering method, and the phase map M1 is created on the basis of the classification results. Similarly, the phase map M2 is created using the second spectrum imaging data piece D2, the phase map M3 is created using the third spectrum imaging data piece D3, and the phase map M4 is created using the fourth spectrum imaging data piece D4. The combined phase map M is then created by combining the phase map M1, the phase map M2, the phase map M3, and the phase map M4 created in this manner.

The processing for creating the respective phase maps M1, M2, M3, and M4 is performed individually and is therefore unrelated. Hence, when the representative spectra are classified, even if the same phase exists on a plurality of phase maps, the phase may be classified as different phases. As a result, as illustrated in FIG. 11, identical phases (compounds) are displayed as different phases on the combined phase map M. Therefore, when phase analysis is performed on a plurality of pieces of spectrum imaging data using the analysis method according to the reference example, it may be impossible to acquire consistent phase analysis results.

With the phase analyzer 80, on the other hand, the overall representative spectrum group G is acquired by performing multivariate analysis using all of the representative spectra included in the partial representative spectrum groups acquired respectively in relation to the pieces of spectrum imaging data as a subject, and therefore phase analysis can be performed on the plurality of pieces of spectrum imaging data on the basis of a shared classification result (a shared cluster analysis result). With the phase analyzer 80, therefore, consistent phase analysis results can be acquired from a plurality of pieces of spectrum imaging data.

In the phase analyzer 80, the phase analysis unit 805 creates a phase map for each piece of spectrum imaging data by classifying the spectrum of each pixel using the overall representative spectrum group G, and creates the combined phase map M by combining the phase maps created respectively for the pieces of spectrum imaging data. With the phase analyzer 80, therefore, a plurality of phase maps having consistency can be created, and as a result, a favorable combined phase map M can be acquired.

4. MODIFIED EXAMPLES

Next, modified examples of the analysis method employed in the phase analyzer 80 will be described. Points that differ from the example of the phase analyzer 80 described above will be described below, while description of similar points has been omitted.

4.1. First Modified Example

Figure 12:
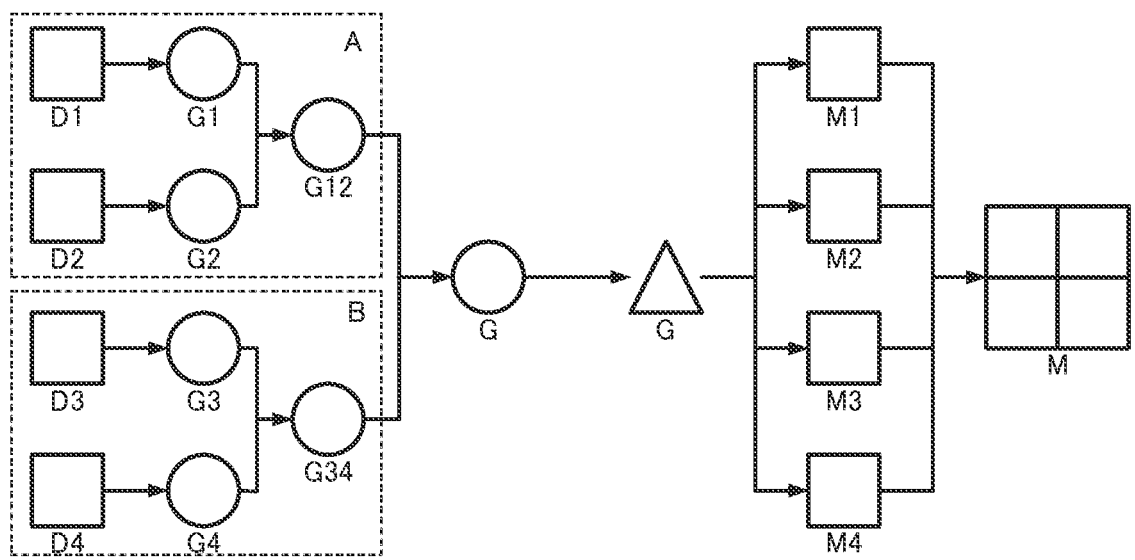
FIG. 12 is a diagram for describing an analysis method according to a first modified example.

FIG. 12 is a diagram for describing an analysis method according to a first modified example.

In the embodiment described above, in the processing S20 for acquiring the partial representative spectrum groups, as illustrated in FIG. 4, the first acquisition unit 802 acquires a partial representative spectrum group for each of the plurality of pieces of spectrum imaging data by performing multivariate analysis on each piece of spectrum imaging data.

In the first modified example, on the other hand, in the processing S20 for acquiring the partial representative spectrum groups, as illustrated in FIG. 4, the first acquisition unit 802 divides the plurality of pieces of spectrum imaging data into a plurality of groups and acquires a partial representative spectrum group for each group by performing multivariate analysis on each group.

First, as illustrated in FIG. 12, the first acquisition unit 802 divides the four pieces of spectrum imaging data acquired by the data acquisition unit 801 into two groups. In the example in the figure, the first spectrum imaging data piece D1 and the second spectrum imaging data piece D2 are set as group A, while the third spectrum imaging data piece D3 and the fourth spectrum imaging data piece D4 are set as group B.

The first acquisition unit 802 acquires the partial representative spectrum group G1 by performing multivariate analysis on the first spectrum imaging data piece D1 belonging to group A. Similarly, the first acquisition unit 802 acquires the partial representative spectrum group G2 by performing multivariate analysis on the second spectrum imaging data piece D2 belonging to group A.

Next, the first acquisition unit 802 extracts representative spectra from the plurality of representative spectra included in the partial representative spectrum group G1 and the partial representative spectrum group G2 by performing multivariate analysis on the partial representative spectrum group G1 and the partial representative spectrum group G2, and in so doing acquires a partial representative spectrum group G12 of group A.

Similarly, the first acquisition unit 802 extracts representative spectra from the plurality of representative spectra included in the partial representative spectrum group G3 and the partial representative spectrum group G4 by performing multivariate analysis on the partial representative spectrum group G3 and the partial representative spectrum group G4, and in so doing acquires a partial representative spectrum group G34 of group B.

Thus, the first acquisition unit 802 acquires partial representative spectrum groups G12 and G34 for the respective groups.

In the processing S30 for acquiring the overall representative spectrum group G, the second acquisition unit 803 acquires the overall representative spectrum group G by performing multivariate analysis on the partial representative spectrum group G12 of group A and the partial representative spectrum group G34 of group B. In other words, the second acquisition unit 803 extracts representative spectra by performing multivariate analysis using all of the representative spectra included in the partial representative spectrum group G12 and the partial representative spectrum group G34 as a subject, and in so doing acquires the overall representative spectrum group G.

In the first modified example, the first acquisition unit 802 divides the plurality of pieces of spectrum imaging data into a plurality of groups and then acquires a partial representative spectrum group for each group by performing multivariate analysis on each group. Hence, in the first modified example, the number of spectra to be processed at one time by the second acquisition unit 803 can be reduced in comparison with a case where, for example, a partial representative spectrum group is acquired for each of the plurality of pieces of spectrum imaging data by performing multivariate analysis on each piece of spectrum imaging data. As a result, in the first modified example, the processing load can be reduced.

4.2. Second Modified Example

Figure 13:
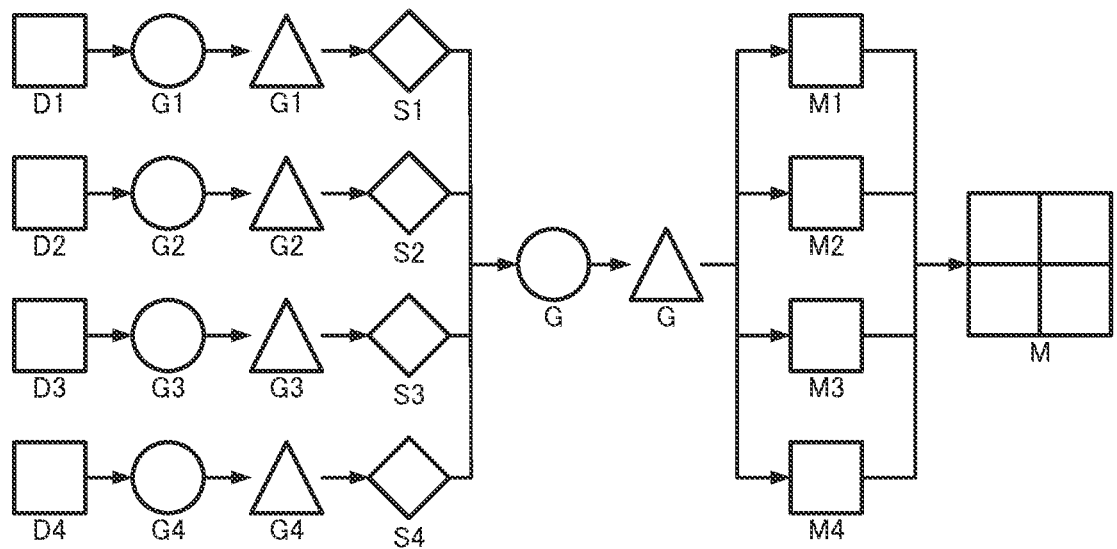
FIG. 13 is a diagram for describing an analysis method according to a second modified example.

FIG. 13 is a diagram for describing an analysis method according to a second modified example.

In the embodiment described above, in the processing S30 for acquiring the overall representative spectrum group G, as illustrated in FIG. 4, the second acquisition unit 803 acquires the overall representative spectrum group G by performing multivariate analysis on the plurality of partial representative spectrum groups acquired by the first acquisition unit 802.

In the second modified example, on the other hand, in the processing S30 for acquiring the overall representative spectrum group G, as illustrated in FIG. 4, the second acquisition unit 803 classifies the spectrum of each pixel in each of the plurality of pieces of spectrum imaging data using partial representative spectrum groups, and integrates or averages the spectra belonging to each type. As a result, a spectrum group is generated for each piece of spectrum imaging data. The second acquisition unit 803 then acquires the overall representative spectrum group by performing multivariate analysis on the plurality of spectrum groups.

First, the second acquisition unit 803 classifies the plurality of representative spectra included in the partial representative spectrum group G1 acquired by the first acquisition unit 802 using the hierarchical clustering method, and in so doing creates clusters.

Next, the second acquisition unit 803 uses the partial representative spectrum group G1 to classify the spectrum of each pixel in the first spectrum imaging data piece D1, and acquires an integrated spectrum group S1 by integrating the spectra belonging to each type (cluster). The integrated spectrum group S1 is a collection of integrated spectra, which is acquired by integrating spectra belonging to identical clusters (phases), among the spectra of the respective pixels of the first spectrum imaging data piece D1. In other words, the integrated spectrum group S1 includes spectra integrated for each phase.

Similarly, the second acquisition unit 803 performs similar processing to that of the partial representative spectrum group G1 on the partial representative spectrum group G2 so as to acquire an integrated spectrum group S2. Similarly, the second acquisition unit 803 performs similar processing to that of the partial representative spectrum group G1 on the partial representative spectrum group G3 so as to acquire an integrated spectrum group S3. Similarly, the second acquisition unit 803 performs similar processing to that of the partial representative spectrum group G1 on the partial representative spectrum group G4 so as to acquire an integrated spectrum group S4.

The second acquisition unit 803 acquires the overall representative spectrum group G by performing multivariate analysis on the integrated spectrum group S1, the integrated spectrum group S2, the integrated spectrum group S3, and the integrated spectrum group S4. In other words, the second acquisition unit 803 extracts representative integrated spectra by performing multivariate analysis using all of the integrated spectra included in the integrated spectrum group S1, the integrated spectrum group S2, the integrated spectrum group S3, and the integrated spectrum group S4 as a subject, and in so doing acquires the overall representative spectrum group G.

Note that here, a case in which the second acquisition unit 803 generates integrated spectrum groups by integrating the spectra belonging to each type was described, but instead, the second acquisition unit 803 may generate averaged spectrum groups by averaging the spectra belonging to each type.

In the second modified example, the second acquisition unit 803 classifies the spectrum of each pixel in each of the plurality of pieces of spectrum imaging data using a partial representative spectrum group, generates a spectrum group for each piece of spectrum imaging data by integrating or averaging the spectra belonging to each type, and acquires the overall representative spectrum group G by performing multivariate analysis on the plurality of spectrum groups. As a result, in the second modified example, a consistent combined phase map can be created from a plurality of pieces of spectrum imaging data.

4.3. Third Modified Example

In the embodiment described above, the plurality of imaging data, as illustrated in FIG. 5, are a plurality of data acquired by analyzing different regions of the same sample S, but the plurality of imaging data are not limited thereto.

Figure 14:
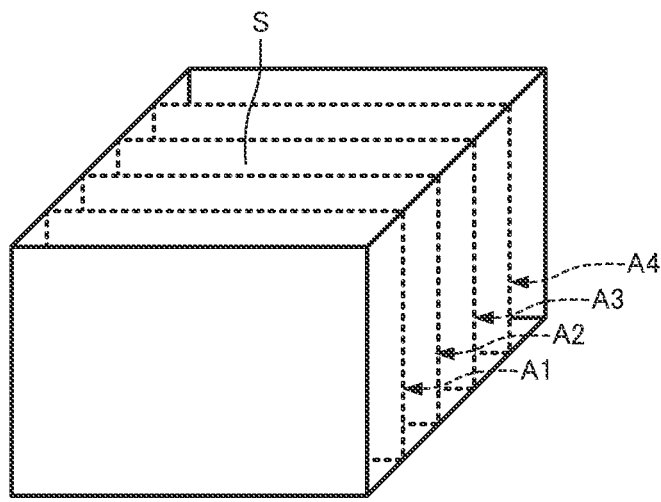
FIG. 14 is a diagram for describing an example of a method for acquiring a plurality of pieces of spectrum imaging data.

FIG. 14 is a diagram for describing an example of a method for acquiring a plurality of pieces of spectrum imaging data.

For example, as illustrated in FIG. 14, different areas of a cross-section (a first area A1, a second area A2, a third area A3, and a fourth area A4) can be measured by repeatedly performing sectioning and measurement on a single sample S using a scanning electron microscope equipped with a focused ion beam system (an FIB-SEM). The plurality of pieces of spectrum imaging data may be a plurality of pieces of data acquired by analyzing consecutive cross-sections in this manner. By combining phase maps acquired respectively from the plurality of pieces of spectrum imaging data, an image showing a three-dimensional compound distribution can be acquired.

Figure 15:
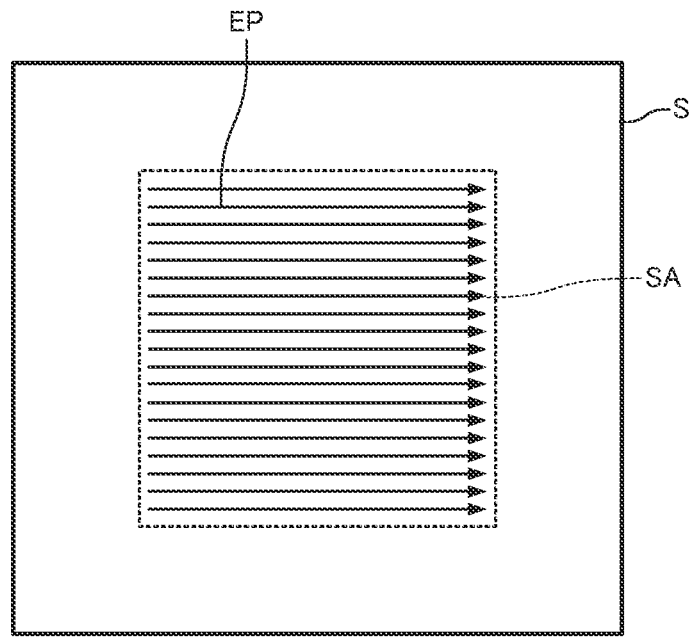
FIG. 15 is a diagram for describing an example of a method for acquiring a plurality of pieces of spectrum imaging data.
Figure 16:
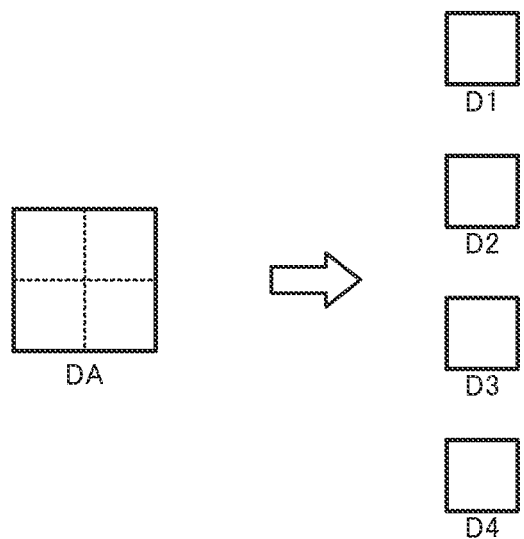
FIG. 16 is a diagram for describing an example of a method for acquiring a plurality of pieces of spectrum imaging data.

FIGS. 15 and 16 are diagrams for describing an example of a method for acquiring a plurality of pieces of spectrum imaging data.

For example, as illustrated in FIGS. 15 and 16, a plurality of pieces of spectrum imaging data may be acquired by dividing spectrum imaging data DA acquired by analyzing a single analysis area SA of the sample S. In the example in FIG. 16, the spectrum imaging data DA acquired by analyzing the single analysis area SA is divided into four pieces of spectrum imaging data (a first spectrum imaging data piece D1, a second spectrum imaging data piece D2, a third spectrum imaging data piece D3, and a fourth spectrum imaging data piece D4).

Alternatively, for example, the plurality of imaging data may be in-situ observation data acquired by analyzing a analysis area of the sample S at different times. For example, the plurality of imaging data may be a plurality of pieces of data acquired by repeatedly analyzing the sample S while heating the sample S or a plurality of pieces of data acquired by observing a growth process or a reaction process of a crystal in-situ.

4.4. Fourth Modified Example

In the embodiment described above, a case in which the sample analyzer 100 is a scanning electron microscope including the X-ray detector 70 was described, but the sample analyzer according to the invention is not limited thereto. For example, the sample analyzer according to the invention may be any device capable of acquiring spectra of signals (X-rays, electrons, ions, or the like) from the sample S. The sample analyzer according to the invention may be a transmission electron microscope including an energy-dispersive X-ray spectrometer or a wavelength-dispersive X-ray spectrometer, an electron probe microanalyzer, an Auger microprobe, a photoelectric spectrometry device, a focused ion beam system, or the like.

Also, the above-described embodiments and modified examples are merely examples, and the invention is not limited thereto. For example, the embodiments and modified examples can be combined as appropriate.

The invention is not limited to the above-described embodiments, and various modifications are possible. For example, the invention includes configurations that are substantially the same as the configurations described in the embodiments. Substantially same configurations mean configurations having the same functions, methods and results, or configurations having the same objectives and effects as those of the configurations described in the embodiments, for example. The invention also includes configurations obtained by replacing non-essential elements of the configurations described in the embodiments with other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

What is claimed is:

1. A phase analyzer comprising:
a data acquisition unit that acquires a plurality of pieces of spectrum imaging data in which positions on a sample are associated with spectra which are based on signals from the sample;
a first acquisition unit that acquires a first representative spectrum group for each piece of spectrum imaging data by performing multivariate analysis on each of the plurality of pieces of spectrum imaging data by extracting representative spectra from a plurality of X-ray spectra included in each of the plurality of pieces of spectrum imaging data, thereby acquiring a plurality of first representative spectrum groups comprising a collection of spectra representing the plurality of X-ray spectra included in each of the plurality of pieces of spectrum imaging data;
a second acquisition unit that acquires a second representative spectrum group by performing multivariate analysis on the plurality of first representative spectrum groups acquired by the first acquisition unit by extracting representative spectra from each of the plurality of first representative spectrum groups to acquire the second representative spectrum group, which is an overall representative spectrum group comprising a plurality of representative spectra representing all of the plurality of pieces of spectrum imaging data;
a classification unit that classifies the plurality of representative spectra included in the second representative spectrum group acquired by the second acquisition unit and creates clusters; and
a phase analysis unit that performs phase analysis on each of the plurality of pieces of spectrum imaging data by using the second representative spectrum group by determining a similarity between an X-ray spectrum of each pixel of the plurality of pieces of spectrum imaging data and each representative spectrum included in the second representative spectrum group and determining one of the clusters to which each pixel belongs.

2. The phase analyzer according to claim 1, wherein
the phase analysis unit creates a phase map for each of the pieces of spectrum imaging data by classifying a spectrum of each pixel by using the second representative spectrum group, and
the phase analysis unit creates a combined phase map by combining the phase maps created respectively for the pieces of spectrum imaging data.

3. The phase analyzer according to claim 1, wherein
the first acquisition unit divides the plurality of pieces of spectrum imaging data into a plurality of groups, and
the first acquisition unit acquires the first representative spectrum group for each of the groups by performing multivariate analysis on each of the groups.

4. The phase analyzer according to claim 1, wherein
the second acquisition unit classifies the spectrum of each pixel in each of the plurality of pieces of spectrum imaging data using the first representative spectrum groups, and generates spectrum groups by integrating or averaging spectra belonging to each type, and
the second acquisition unit acquires the second representative spectrum group by performing multivariate analysis on the plurality of spectrum groups.

5. A sample analyzer comprising the phase analyzer according to claim 1.

6. An analysis method comprising:
acquiring a plurality of pieces of spectrum imaging data in which positions on a sample are associated with spectra which are based on signals from the sample;
acquiring a first representative spectrum group for each piece of spectrum imaging data by performing multivariate analysis on each of the plurality of pieces of spectrum imaging data by extracting representative spectra from a plurality of X-ray spectra included in each of the plurality of pieces of spectrum imaging data, thereby acquiring a plurality of first representative spectrum groups comprising a collection of spectra representing the plurality of X-ray spectra included in each of the plurality of pieces of spectrum imaging data;
acquiring a second representative spectrum group by performing multivariate analysis on the acquired plurality of first representative spectrum groups by extracting representative spectra from each of the plurality of first representative spectrum groups to acquire the second representative spectrum group, which is an overall representative spectrum group comprising a plurality of representative spectra representing all of the plurality of pieces of spectrum imaging data;
classifying the plurality of representative spectra included in the second representative spectrum group acquired by the second acquisition unit and creates clusters; and
performing phase analysis on each of the plurality of pieces of spectrum imaging data by using the second representative spectrum group by determining a similarity between an X-ray spectrum of each pixel of the plurality of pieces of spectrum imaging data and each representative spectrum included in the second representative spectrum group and determining one of the clusters to which each pixel belongs.

* * * * *